(12) United States Patent
Puvvada et al.

(10) Patent No.: US 11,989,094 B2
(45) Date of Patent: May 21, 2024

(54) MINIMIZING DATA TRANSFER AND STORAGE UTILIZATION ON CLOUD OBJECT STORAGE SYSTEMS

(71) Applicant: International Business Machines Corporation, Armonk, NY (US)

(72) Inventors: Venkateswara Rao Puvvada, Inkollu (IN); Karrthik Kalaga Gopalakrishnan, Kodaikanal (IN); Saket Kumar, Bettiah (IN); Ashish Chaurasia, Pune (IN)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 17/897,272

(22) Filed: Aug. 29, 2022

(65) Prior Publication Data
US 2024/0070028 A1    Feb. 29, 2024

(51) Int. Cl.
*G06F 12/00* (2006.01)
*G06F 11/14* (2006.01)
*G06F 16/27* (2019.01)

(52) U.S. Cl.
CPC ...... *G06F 11/1435* (2013.01); *G06F 11/1466* (2013.01); *G06F 16/27* (2019.01)

(58) Field of Classification Search
CPC ... G06F 11/1435; G06F 11/1466; G06F 16/27
USPC ........................................................ 711/162
See application file for complete search history.

(56) References Cited

U.S. PATENT DOCUMENTS

| | | | |
|---|---|---|---|
| 9,229,942 B1 * | 1/2016 | MacNeill | G06F 16/119 |
| 9,323,758 B1 * | 4/2016 | Stacey | G06F 16/113 |
| 11,157,458 B1 | 10/2021 | Carter et al. | |
| 2014/0201177 A1 * | 7/2014 | Suryanarayan | G06F 16/182 |
| | | | 707/705 |
| 2015/0269203 A1 * | 9/2015 | Baldwin | G06F 16/2228 |
| | | | 707/741 |
| 2020/0341855 A1 | 10/2020 | Tanwer et al. | |

(Continued)

OTHER PUBLICATIONS

Disclosed Anonymously, "Hardlinks Recovery without Using Inode Numbers in the Object Storage Systems," An IP.com Prior Art Database Technical Disclosure, IPCOM000265601D, Apr. 28, 2021.

(Continued)

*Primary Examiner* — Mardochee Chery
(74) *Attorney, Agent, or Firm* — Monchai Chuaychoo (57) ABSTRACT

A method for minimizing data transfer and storage utilization on cloud object storage systems is disclosed. In one embodiment, such a method replicates a file from a production system to a cloud object storage system. The method determines whether a number of hard links associated with the file is greater than one. In the event the number is greater than one, the method creates, on the cloud object storage system, a special object for the file and associates the file with the special object. Upon creating a hard link on the production system in association with the file, the method replicates the hard link from the production system to the cloud object storage system without replicating data associated with the file. A metadata reference to the special object is added to the hard link on the cloud object storage system. A corresponding system and computer program product are also disclosed.

20 Claims, 7 Drawing Sheets

(56) References Cited

U.S. PATENT DOCUMENTS

2021/0303594 A1    9/2021   Puvvada et al.

OTHER PUBLICATIONS

PCT International Search Report and Written Opinion, International Application No. PCT/IB2023/057570, Oct. 20, 2023.
Veritas, "Veritas NetBackup Administrator's Guide, vol. I," Veritas.com, May 27, 2019.
Veritas, "NetBackup in the Public Cloud, Guidelines for Azure Deployments," White Paper, Apr. 2022.
Anonymous, "Veritas NetBackup 7.7 Supports Cloudian's Smart Object Storage Platform for Data Backup," Data and Storage News from around South East Asia, datastorageasean.com, Aug. 28, 2015.

* cited by examiner

MINIMIZING DATA TRANSFER AND STORAGE UTILIZATION ON CLOUD OBJECT STORAGE SYSTEMS

BACKGROUND

Field of the Invention

This invention relates to systems and methods for minimizing data transfer and storage utilization on cloud object storage systems.

Background of the Invention

In data replication environments, one site may be designated as a production site (also referred to as a "cache site") and a second site (i.e., a receiving site) may be designated as a disaster recovery site (also referred to as a "home site"). In certain configurations, the production site may capture all operations that are performed on a local fileset/filesystem and maintain a local queue of operations in a first come first queue order. This queue may be maintained on one node of the production site cluster. In certain cases, this node is designated as a gateway node that is configured to maintain the replication queue in memory. Application nodes in the production site cluster may generate remote procedure calls when a local operation is performed on the fileset in order to update the gateway node with the operation.

In certain cases, replication may occur from one clustered filesystem to another clustered filesystem or to cloud object storage for the purpose of backup and disaster recovery. This may be accomplished using a standard-based protocol (such as NFS, S3, etc.) or using the actual filesystem protocol itself in the event the production and backup filesystems are of the same type (e.g., IBM Spectrum Scale). The S3 protocol that is supported for cloud object storage is not POSIX compliant, but all POSIX compliant operations need to be replicated over the S3 protocol to end up on the remote cloud object storage (i.e., the backup site).

One feature that is helpful to preserve or minimize storage utilization is the hard link feature. When a hard link is created for a file on a traditional filesystem, access to the file is provided through an entirely new path inside the filesystem. When a new hard link is created for a file, an inode link count (i.e., nlink) associated with the file may be incremented. Such hard links, however, are typically not directly supported on cloud object storage servers. As a result, when replication solutions attempt to replicate hard link operations to a cloud object storage server, the hard links may generate new objects at the cloud object storage site.

This may create various problems. For example, this may consume additional storage space at the cloud object storage site since an object (i.e., file) may be stored multiple times at the cloud object storage site. In addition, this may cause more data to be transmitted from the production site to the cloud object storage site since the same object may need to be transferred more than once. This problem is compounded when there are additional hard links for a file and/or if the file for which the hard links are created is larger in size. In use cases where objects are retrieved from the cloud object storage site, such as to recreate a new filesystem at the production site and repopulate it with files from the cloud object storage site, the duplicate copies of the files at the cloud object storage site may need to be copied back to the production site. This may cause more data to be transmitted from the cloud object storage site to the production site than is necessary to recreate the filesystem.

SUMMARY

The invention has been developed in response to the present state of the art and, in particular, in response to the problems and needs in the art that have not yet been fully solved by currently available systems and methods. Accordingly, the invention has been developed to provide systems and methods to minimize data transfer and storage utilization on cloud object storage systems. The features and advantages of the invention will become more fully apparent from the following description and appended claims, or may be learned by practice of the invention as set forth hereinafter.

Consistent with the foregoing, a method for minimizing data transfer and storage utilization on cloud object storage systems is disclosed. In one embodiment, such a method includes replicating a file from a production system to a cloud object storage system. The method determines whether a number of hard links associated with the file is greater than one. In the event the number of hard links is greater than one, the method creates, on the cloud object storage system, a special object for the file and associates the file with the special object. Upon creating a hard link on the production system in association with the file, the method replicates the hard link from the production system to the cloud object storage system without replicating data associated with the file. A metadata reference to the special object is added to the hard link on the cloud object storage system.

In another embodiment of the invention, a computer program product is disclosed for minimizing data transfer and storage utilization on cloud object storage systems. The computer program product includes a non-transitory computer-readable storage medium having computer-usable program code embodied therein. The computer-usable program code configured to replicate a file from a production system to a cloud object storage system. The computer-usable program code determines whether a number of hard links associated with the file is greater than one. In the event the number of hard links is greater than one, the computer-usable program code creates, on the cloud object storage system, a special object for the file and associates the file with the special object. Upon creating a hard link on the production system in association with the file, the computer-usable program code replicates the hard link from the production system to the cloud object storage system without replicating data associated with the file. A metadata reference to the special object is added to the hard link on the cloud object storage system.

In another embodiment of the invention, a system for minimizing data transfer and storage utilization on cloud object storage systems includes at least one processor and at least one memory device operably coupled to the at least one processor and storing instructions for execution on the at least one processor. The instructions cause the at least one processor to replicate a file from a production system to a cloud object storage system. The instructions further cause the at least one processor to determine whether a number of hard links associated with the file is greater than one. In the event the number of hard links is greater than one, the instructions create, on the cloud object storage system, a special object for the file and associate the file with the special object. Upon creating a hard link on the production system in association with the file, the instructions replicate the hard link from the production system to the cloud object storage system without replicating data associated with the file. A metadata reference to the special object is added to the hard link on the cloud object storage system.

In certain embodiments, the special object is only created for a file having more than one hard link. In other or the same embodiments, determining whether a number of hard links associated with the file is greater than one comprises reading a hard link count maintained for the file. Similarly, in certain embodiments, replicating the hard link from the production system to the cloud object storage system comprises replicating the hard link without replicating data associated with the file. In certain embodiments, the special object is a hidden object. In certain embodiments, restoring the file and associated hard links from the cloud object storage system to the production system comprises locating, on the cloud object storage system, the file and hard link object that reference the special object.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

Figure 1:
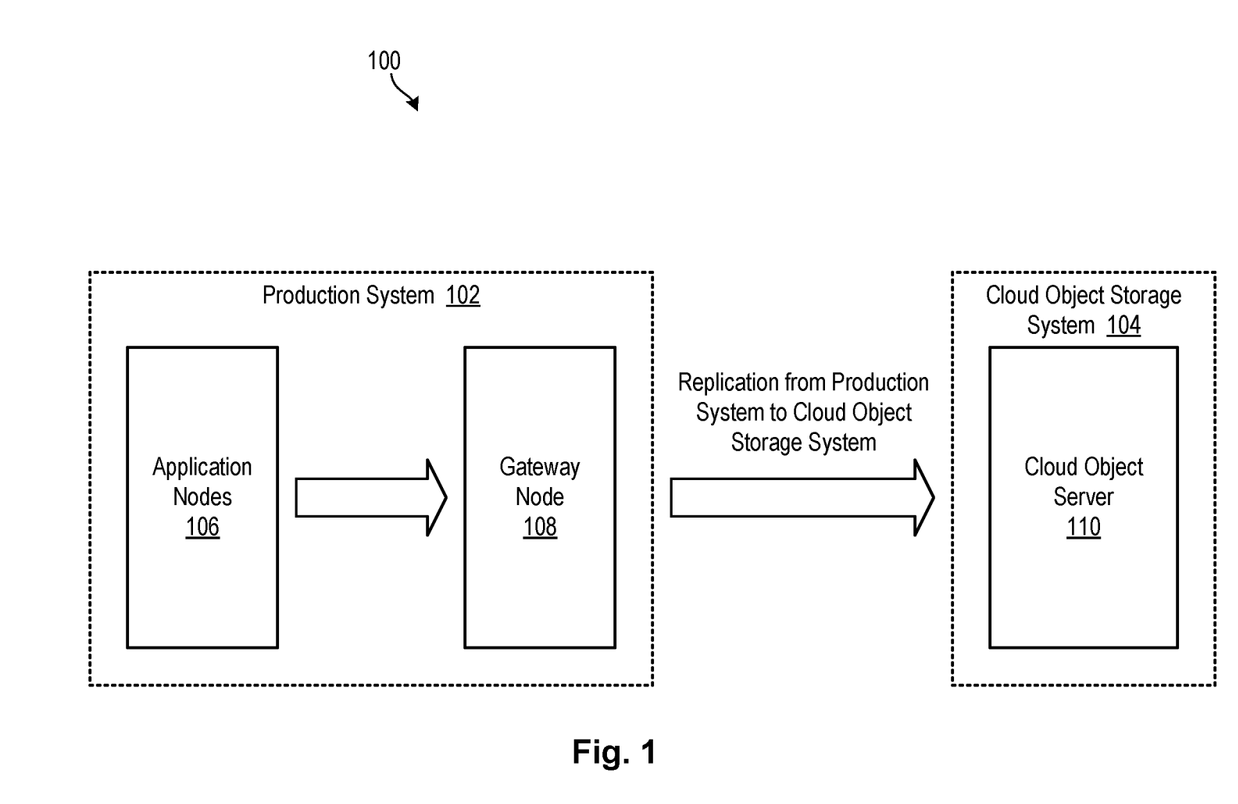
FIG. 1 is a high-level block diagram showing data replication from a production system to a cloud object storage system.

Referring to FIG. 1, a high-level block diagram showing data replication from a production system 102 to a cloud object storage system 104 is illustrated. In certain embodiments, the production system 102 may also be referred to as a "cache site" and the cloud object storage system 104, which may also be referred to as a "home site," may function as a disaster recovery site. In certain configurations, the production system 102 may capture all operations that are performed on a local fileset/filesystem and maintain a local queue of operations in a first come first queue order. This queue may be maintained on one node of the production site cluster. This node may be designated as a gateway node 108 that maintains the replication queue in memory. Application nodes 106 in the production site cluster 102 may generate remote procedure calls when a local operation is performed on the fileset in order to update the gateway node 108 with the operation.

In certain cases, replication may occur from one clustered filesystem to another clustered filesystem or to a cloud object storage system 104 for the purpose of backup and disaster recovery. This may be accomplished using a standard-based protocol (such as NFS, S3) or using the actual filesystem protocol itself in the event the production and backup filesystems are of the same type (e.g., as may occur with IBM Spectrum Scale). The S3 protocol that is supported for cloud object storage is not POSIX compliant, but all POSIX compliant operations need to be replicated over the S3 protocol to end up on the remote cloud object storage server (i.e., the backup site).

One feature that is helpful to preserve or minimize storage space utilization is the hard link feature. When a hard link is created for a file on a traditional filesystem, access to the file is provided through an entirely new path inside the filesystem. When a new hard link is created for a file, an inode link count (i.e., nlink) associated with the file may be incremented. Such hard links, however, are typically not directly supported on cloud object storage servers 110. As a result, when replication solutions attempt to replicate hard link operations to a cloud object storage server 110, the hard links may generate new objects at the cloud object storage site 104.

This may create various problems. For example, this may consume additional storage space at the cloud object storage site 104 since an object (i.e., file) may be stored multiple times at the cloud object storage site 104. In addition, this may cause more data to be transmitted from the production system 102 to the cloud object storage system 104 since the same object may need to be transferred more than once. This problem is compounded when there are additional hard links for a file and/or if the file for which the hard links are created is larger in size. In use cases where objects are retrieved from the cloud object storage system 104, such as to recreate a new filesystem at the production system 102 and repopulate the production system 102 with files from the cloud object storage system 104, the duplicate copies of the files at the cloud object storage system 104 may need to be copied back to the production system 102. This may cause more data to be transmitted from the cloud object storage system 104 to the production system 102 than is necessary to recreate the filesystem.

Figure 2:
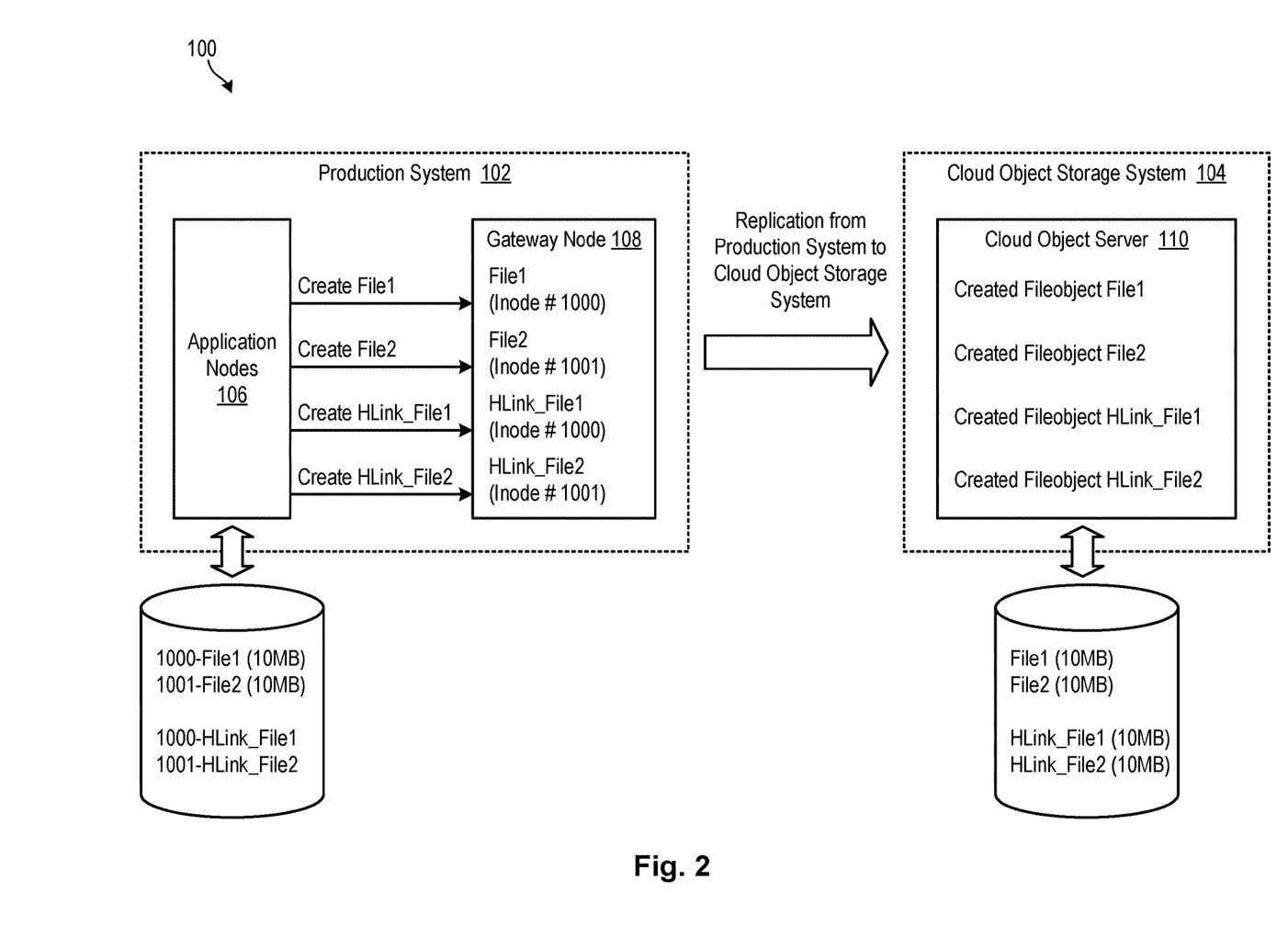
FIG. 2 is a high-level block diagram showing replication of files and hard links from the production system to the cloud object storage system.

FIG. 2 shows one example of this issue in more detail. As shown in FIG. 2, assume that multiple files and associated hard links are stored or created on a production system 102. In the illustrated example, these files include "File1" with inode number "1000" and "File2" with inode number "1001." As further shown in FIG. 1, a hard link "HLink_File1" is stored or created for File1 and a hard link "HLink_File2" is stored or created for File2. These hard links may enable access to File1 and File2, respectively, through an entirely new path within the filesystem and minimize storage space utilization on the production system 102 by eliminating or reducing the need to store multiple copies of the files. When these files and hard links are created on the application nodes 106, the application nodes 106 may generate remote procedure calls that update a gateway node 108 with these operations, as shown in FIG. 2. These files and hard links may then be replicated from the production system 102 to a cloud object storage system 104 for the purpose and backup and/or disaster recovery.

As shown in FIG. 2, at the cloud object storage system 104, an object may be created for File 1, an object may be created for File 2, an object may be created for HLink_File1, and object may be created for HLink_File2. Because hard links may not be supported on the cloud object storage system 104, creating the hard links on the cloud object storage system 104 may generate new objects on the cloud object storage system 104 that contain all of the data from the files that they link to. Thus, assuming File1 consumes 10 Megabytes (MB) of storage space on the production system 102, replicating File1 and its associated hard link HLink_File1 to the cloud object storage system 104 may cause double that amount of data to be transferred and consumed on the cloud object storage system 104. Similarly, replicating File2 and its associated hard link HLink_File2 from the production system 102 to the cloud object storage system 104 may double the amount of data that is transferred to and consumed on the cloud object storage system 104, as shown in FIG. 2.

Figure 3:
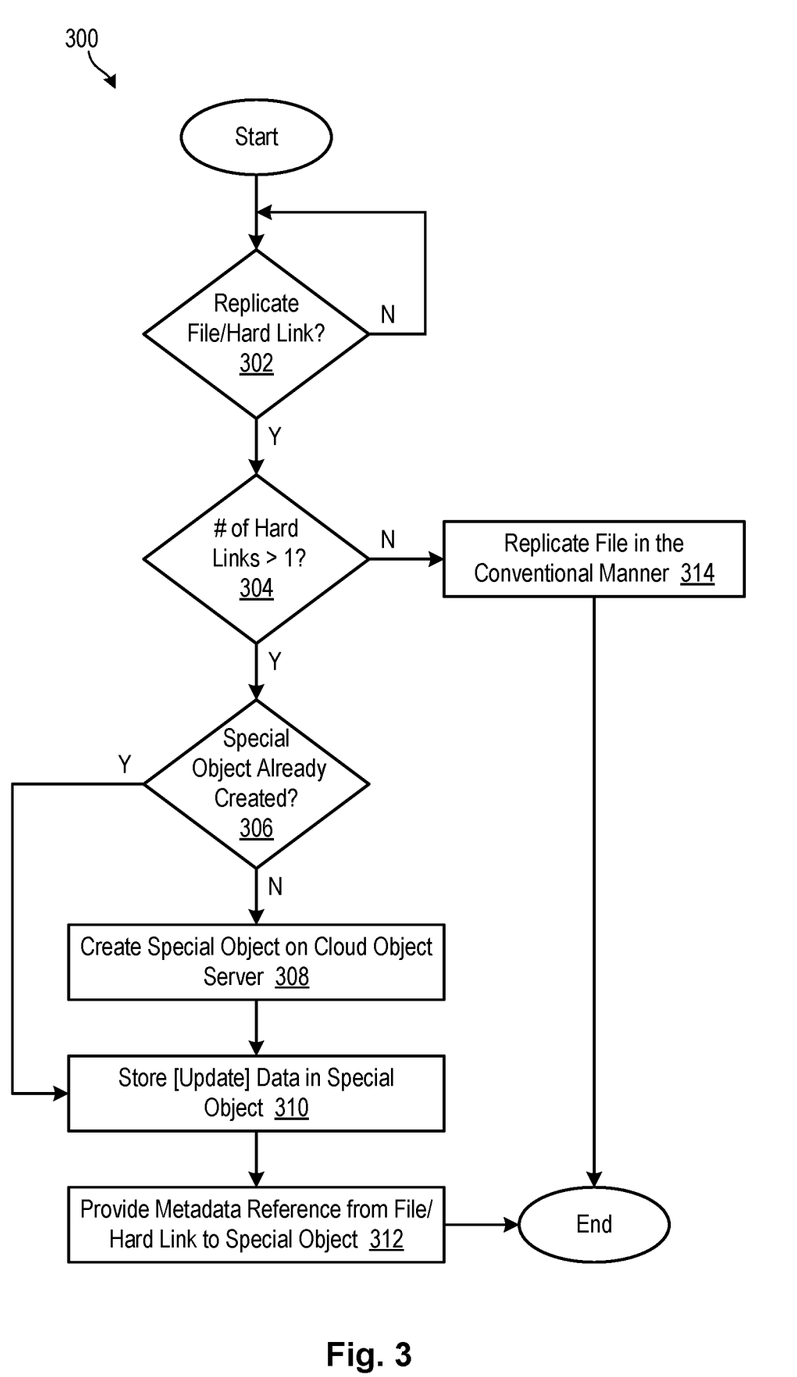
FIG. 3 is a process flow diagram showing one embodiment of an improved technique for replicating files and hard links from a production system to a cloud object storage system.

Referring to FIG. 3, a process flow diagram showing one embodiment of an improved technique for replicating files and hard links from a production system 102 to a cloud object storage system 104 is illustrated. Such a method 300 may minimize an amount of data that is transferred and consumed on a cloud object storage system 104 when replicating files and hard links thereto.

As shown, the method 300 initially determines 302 whether a file or hard link associated with the file needs to be replicated from a production system 102 to a cloud object storage system 104. If so, the method 300 determines 304 a number of hard links that are associated with the file. In certain embodiments, this may involve reading an inode link count (nlink) that is maintained for the file. If the number of hard links is not greater than one, the method 300 replicates 314 the file from the production system 102 to the cloud object storage system 104 in the conventional manner.

If, on the other hand, the number of hard links is greater than one, the method 300 determines whether a special object has been created for the file on the cloud object storage system 104. As will be explained in more detail hereafter in association with FIG. 4, for files having multiple hard links (e.g., an nlink value that is greater than one), methods in accordance with the invention may create a special object on the cloud object storage system 104 in association with the file. In certain embodiments, this special object may be created with the following naming convention: ".afm/+file inode number/+file generation number/+file creation time/". Objects starting with ".afm" may be used to designate internal objects in the cloud object storage system 104. Such an internal object may be configured to carry all data relevant to the original file on the production system 102. In certain embodiments, the special object may also store a number of hard links (e.g., the nlink value) that are associated with the file. This value may be useful when restoring a file and associated hard links from the cloud object storage system 104 to the production system 102, as will be explained in more detail hereafter.

Once the special object is created, all other hard links may be stored as objects without any data (i.e., metadata-only objects) on the cloud object storage system 10. These hard link objects may contain a metadata reference that points to the special object. In this way, the hard links may be independent of the data to which they point or reference. As a result, operations such as creates, renames, or removes that are performed on hard links or the original file that the hard links reference may be easily replicated to the cloud object storage system 104 without having to replicate any data associated with the file or to touch or alter the data associated with the file on the cloud object storage system 104. This preserves a significant amount of storage space on the cloud object storage system 104 since it eliminates or reduces duplicate copies of the data. This, in turn, reduces costs associated with maintaining the cloud object storage system 104 and the data stored thereon, as well as costs associated with transferring data from the production system 102 to the cloud object storage system 104.

If, at step 306, where a number of hard links is greater than one and a special object has not already be created for a file or hard link, the method 300 creates 308 the special object on the cloud object storage system 104 and stores 310 data associated with the hard link or file in the special object.

If, at step 306, the special object has already been created on the cloud object storage system 104, the method 300 provided 312 a metadata reference in the hard link object that points to the special object. In this way, no data is stored with the hard link object and the data in the special object remains untouched. This allows the hard link object to remain independent of the data that it carries or to which it provides an access path.

Figure 4:
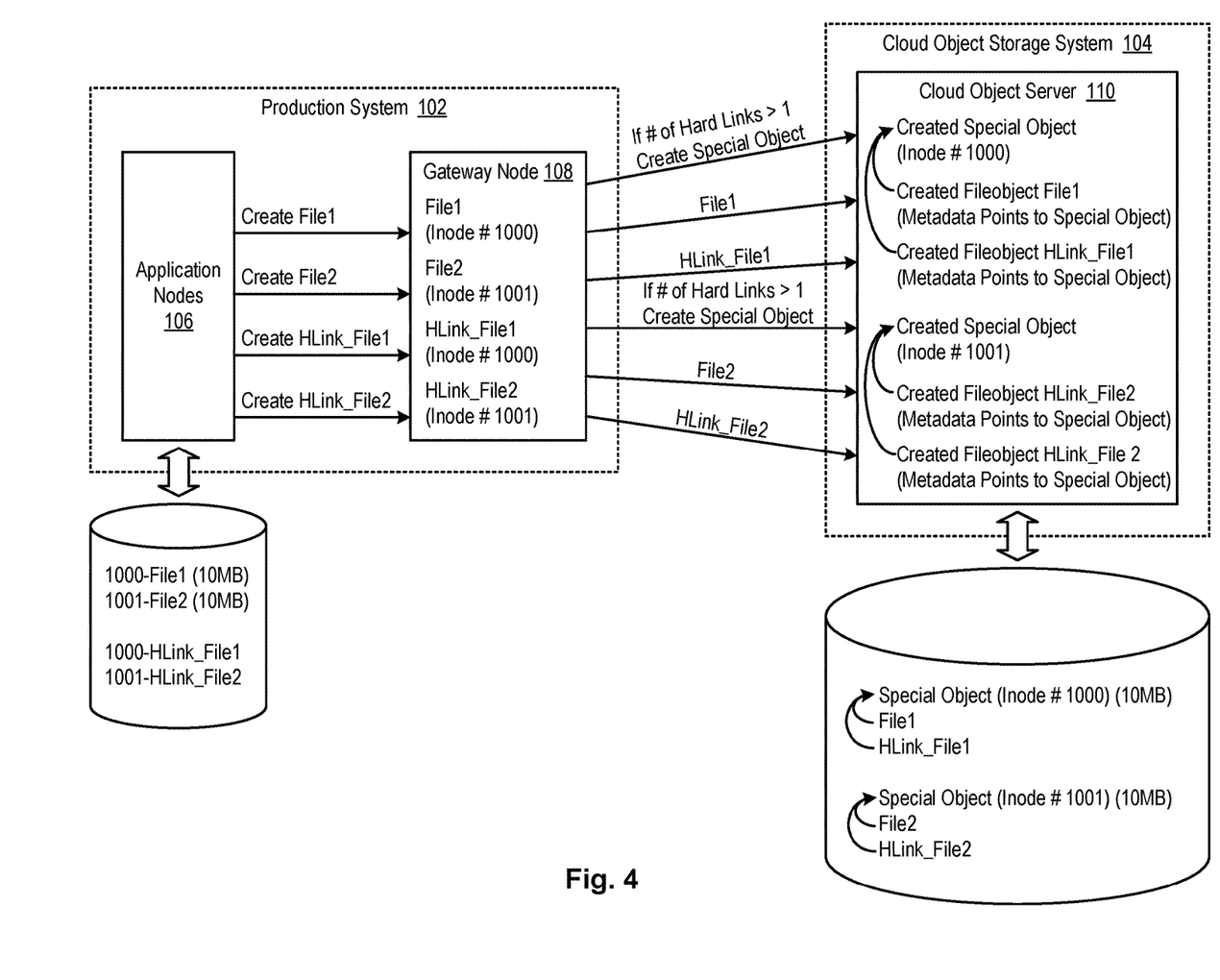
FIG. 4 is a high-level block diagram showing an example of the improved replication technique of FIG. 3.

FIG. 4 shows an example of the method 300 of FIG. 3. This example builds on the example illustrated and discussed in association with FIG. 2. As shown in FIG. 4, when files and associated hard links are replicated from the production system 102 to the cloud object storage system 104, the method 300 may determine whether a number of hard links associated with a particular file is greater than one. If the count is greater than one, the method 300 creates a special object for the file on the cloud object storage system 104.

For example, assuming that each of File1 and File2 have a hard link count that is greater than one, a first special object may be created on the cloud object storage system 104 for File1 (i.e., inode number "1000") and a second special object may be created on the cloud object storage system 104 for File2 (i.e., inode number "1001"). The data associated with File1 may be stored in the special object associated with File1 and the data associated with File2 may be stored in the special object associated with File2. Similarly, objects without any data (i.e., metadata-only objects) are created and stored on the cloud object storage system 104 for File1 and HLink_File1. These objects contain metadata references that point to the special object for File1 as shown by the arrows of FIG. 4. In a similar manner, objects without any data are created and stored on the cloud object storage system 104 for File2 and HLink_File2. These objects also contain metadata references that point to the special object for File2 as shown by the arrows of FIG. 4. As shown in FIG. 4, the result of this technique is two special objects each storing 10 MB on the cloud object storage system 104. Each special object had associated therewith a metadata-only file and hard link object (and thus with negligible size) that contain metadata references pointing to the special object.

Figure 5:
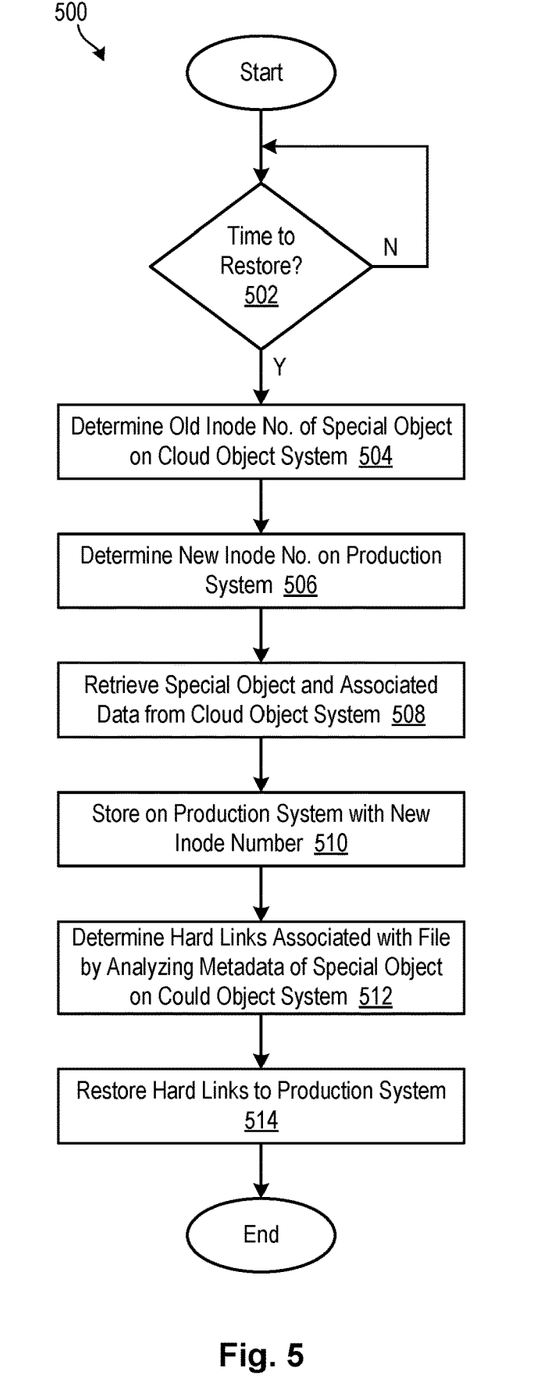
FIG. 5 is a process flow diagram showing one embodiment of an improved technique for restoring files and hard links from a cloud object storage system to a production system.

Referring to FIG. 5, a process flow diagram showing one embodiment of an improved technique for restoring files and hard links from a cloud object storage system 104 to a production system 102 is illustrated. In certain cases, one or more filesystems on the production system 102 may need to be restored or rebuilt using data on the cloud object storage system 104. FIG. 5 shows one embodiment of a method 500 for restoring files and hard links to the production system 102, assuming the files and hard links have been created and stored on the cloud object storage system 104 using the techniques illustrated in FIGS. 3 and 4.

As shown, the method 500 may initially determine 502 whether it is time to restore files and/or hard links from the production system 102 to the cloud object storage system 104. This may be in response to a failure, maintenance, or other events on the production system 102. When a particular file and/or hard link is ready to be restored, the method 500 may determine 506 an old inode number for a file or hard link that is to be restored. In certain embodiments, this may be accomplished by reading a table on the gateway node 108 that stores a list of inode numbers (e.g., files and associated hard links) that have been stored on the cloud object storage system 104. In certain embodiments, the table may store one or more of a list of old inode numbers that have been stored on the cloud object storage system 104, a list of new inode numbers on the production system 102 to which the old inode number are to be restored, and a hard link count (e.g., nlink value) that is associated with each old inode number.

As shown in FIG. 5, once the old inode number associated with a file is determined, the method 500 may determine 506 the new inode number on the production system 102 to which the old inode number is to be restored. As mentioned above, this be accomplished by reading the table on the gateway node 108. Once the old inode number and the new inode number are determined, the method 500 may retrieve 508 the special object and data that is associated with the old inode number from the cloud object storage system 104. The method 500 may then store 510 the data associated with the file on the production system 102 in the new or rebuilt filesystem using the new inode number.

The method 500 may then determine 512 whether the restored file has any associated hard links that also need to be restored. In certain embodiments, this may be accomplished by reading the hard link count (e.g., nlink value) that is stored for the old inode number in the table. These hard links may then be restored 514 from the cloud object storage system 104 to the production system 102 to provide an access path to the file with the new inode number in the new or restored filesystem.

Figure 6:
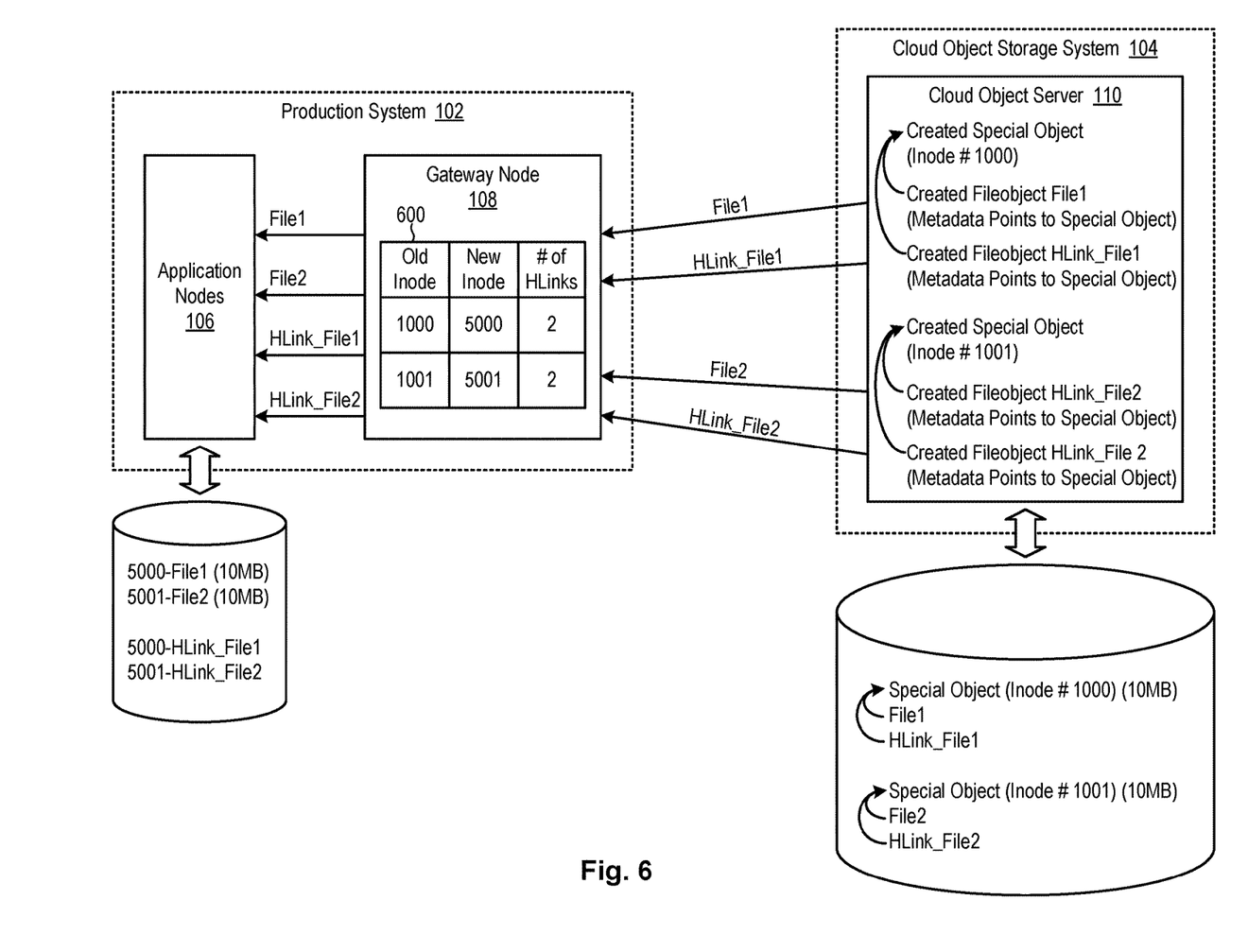
FIG. 6 is a high-level block diagram showing an example of the improved restoration technique of FIG. 5.

FIG. 6 is a high-level block diagram showing an example of the improved restoration technique described in association with FIG. 5. This example builds on the examples illustrated and discussed in association with FIGS. 2 and 4. As shown, the cloud object storage system 104 stores special objects for File1 and File2 along with hard link objects for each.

When filesystems need to be restored on the production system 102, a method 500 in accordance with the invention may determine old inode numbers for files or hard links for the filesystem that pushed the objects to the cloud object storage system 104, and new inode numbers for the new filesystem on the production system 102 to which the files and hard links are to be restored. As shown in FIG. 6, in certain embodiments, a table 600 may be maintained on the production system 102, and more particularly on the gateway node 108, that correlates the old inode number numbers with new inode number numbers, as well as a hard link count for each original inode number. This table 600 may be maintained during a bulk download of objects from the cloud object storage system 104 to populate the new filesystem on the production system 102.

As objects (including metadata-only objects such as hard link objects) are transferred from the cloud object storage system 104 to the production system 102 to repopulate the new filesystem on the production system 102, the table 600 may be referenced to determine the new inode number with which to associate the objects. In certain embodiments, an entry may be removed from the table 600 or marked as complete when a number of hard link objects (i.e., metadata-only hard link objects) that are transferred to the production system 102 matches the hard link count maintained in the table 600. Thus, in the example provided in FIG. 6, an entry for File1 or File2 may be removed from the table 600 or marked as complete when the number of hard link objects restored to the production system 102 equals two.

Figure 7:
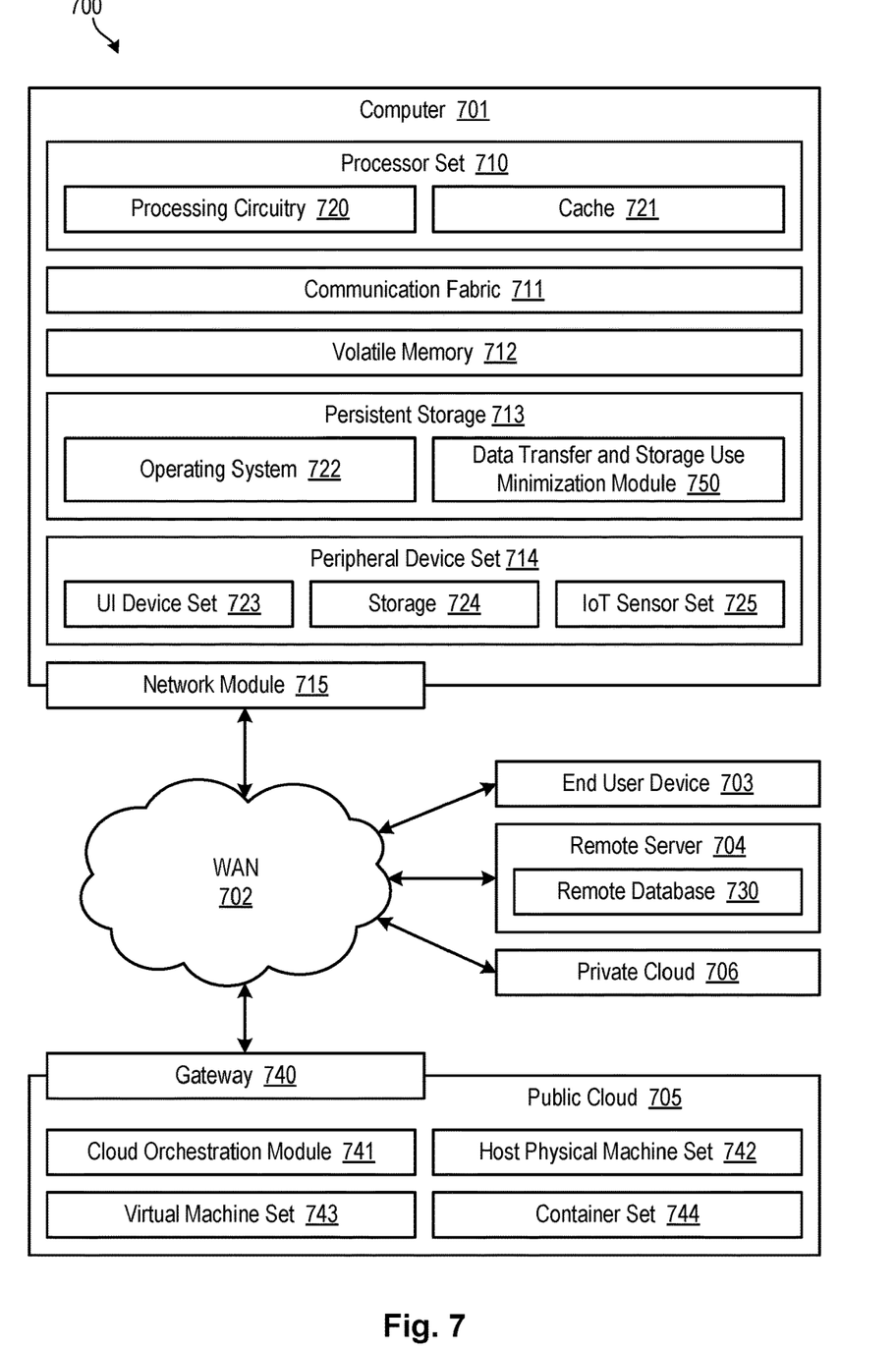
FIG. 7 is a high-level block diagram showing one example of a computing environment for executing computer code for performing any of the inventive methods disclosed herein.

Referring to FIG. 7, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 700 contains an example of an environment for the execution of at least some of the computer code involved in performing the inventive methods, such as code associated with a data transfer and storage use minimization module 750. In certain embodiments, the data transfer and storage use minimization module 750 may be used to perform any of the inventive methods or techniques described in association with FIGS. 1 through 6. In addition to block 750, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 750, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

Computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

Processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 750 in persistent storage 713.

Communication fabric 711 is the signal conduction path that allows the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in block 750 typically includes at least some of the computer code involved in performing the inventive methods.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

Several examples will now be provided to further clarify various aspects of the present disclosure:

Example 1: A method for minimizing data transfer and storage utilization on cloud object storage systems includes replicating a file from a production system to a cloud object storage system. The method determines whether a number of hard links associated with the file is greater than one. In the event the number of hard links is greater than one, the method creates, on the cloud object storage system, a special object for the file and associates the file with the special object. Upon creating a hard link on the production system in association with the file, the method replicates the hard link from the production system to the cloud object storage system without replicating data associated with the file. A metadata reference to the special object is added to the hard link on the cloud object storage system.

Example 2: The limitations of Example 1, wherein the special object is only created for a file having more than one hard link.

Example 3: The limitations of any of Examples 1 and 2, wherein determining whether a number of hard links associated with the file is greater than one comprises reading a hard link count maintained for the file.

Example 4: The limitations of any of Examples 1-3, wherein adding the metadata reference from the hard link object to the special object comprises adding an object path to the hard link object.

Example 5: The limitations of any of Examples 1-4, wherein replicating the hard link from the production system to the cloud object storage system comprises replicating the hard link without replicating data associated with the file.

Example 6: The limitations of any of Examples 1-5, wherein the special object is a hidden object.

Example 7: The limitations of any of Examples 1-6, further comprising, when restoring the file and associated hard links from the cloud object storage system to the production system, locating, on the cloud object storage system, the file and hard link object that reference the special object.

Example 8: A system comprising one or more processor and one or more computer-readable storage media collectively storing program instructions which, when executed by the processor, are configured to cause the processor to perform a method according to any of Examples 1-7.

Example 9: A computer program product comprising one or more computer readable storage media, and program instructions collectively stored on the one or more computer readable storage media, the program instructions comprising instructions configured to cause one or more processors to perform a method according to any one of Examples 1-7.

The invention claimed is:

1. A method for minimizing data transfer and storage utilization on cloud object storage systems, the method comprising:
   replicating a file from a production system to a cloud object storage system;
   determining whether a number of hard links associated with the file is greater than one;
   in the event the number of hard links is greater than one, creating, on the cloud object storage system, a special object for the file;
   associating the file with the special object;
   upon creating a hard link on the production system in association with the file, replicating the hard link from the production system to the cloud object storage system and storing an associated hard link object on the cloud object storage system;
   adding, on the cloud object storage system, a metadata reference from the hard link object to the special object;
   determining a list of inode numbers which contains an old list and a new list of the list of inode numbers;
   locating, on the cloud object storage system, the file and hard link object that reference the special object; and
   restoring the file and associated hard links from the cloud object storage system to the production system based on at least, the old list and/or the new list of the list of inode numbers.

2. The method of claim 1, wherein the special object is only created for a file having more than one hard link.

3. The method of claim 1, wherein determining whether a number of hard links associated with the file is greater than one comprises reading a hard link count maintained for the file.

4. The method of claim 1, wherein adding the metadata reference from the hard link object to the special object comprises adding an object path to the hard link object.

5. The method of claim 1, wherein replicating the hard link from the production system to the cloud object storage system comprises replicating the hard link without replicating data associated with the file.

6. The method of claim 1, wherein the special object is a hidden object.

7. The method of claim 1, wherein restoring the file and associated hard links from the cloud object storage system to the production system further comprising:
   determining the old list of the list of inode numbers;
   determining the new list of the list of inode numbers;
   retrieving the metadata reference;
   storing on to the production system the new list of the inode numbers; and
   determining the hard link on the production system and restoring the hard link and the files from the cloud object storage system to the production system.

8. A computer program product for minimizing data transfer and storage utilization on cloud object storage systems, the computer program product comprising a non-transitory computer-readable storage medium having computer-usable program code embodied therein, the computer-usable program code configured to perform the steps of, following when executed by at least one processor:
   replicating a file from a production system to a cloud object storage system;
   determining whether a number of hard links associated with the file is greater than one;
   in the event the number of hard links is greater than one, creating, on the cloud object storage system, a special object for the file;
   associating the file with the special object; upon creating a hard link on the production system in association with the file, replicating the hard link from the production system to the cloud object storage system and storing an associated hard link object on the cloud object storage system;
   adding, on the cloud object storage system, a metadata reference from the hard link object to the special object;
   determining a list of inode numbers which contains an old list and a new list of the list of inode numbers;
   locating, on the cloud object storage system, the file and hard link object that reference the special object; and
   restoring the file and associated hard links from the cloud object storage system to the production system based on at least, the old list and/or the new list of the list of inode numbers.

9. The computer program product of claim 8, wherein the special object is only created for a file having more than one hard link.

10. The computer program product of claim 8, wherein determining whether a number of hard links associated with the file is greater than one comprises reading a hard link count maintained for the file.

11. The computer program product of claim 8, wherein adding the metadata reference from the hard link object to the special object comprises adding an object path to the hard link object.

12. The computer program product of claim 8, wherein replicating the hard link from the production system to the cloud object storage system comprises replicating the hard link without replicating data associated with the file.

13. The computer program product of claim 8, wherein the special object is a hidden object.

14. The computer program product of claim 8, wherein restoring the file and associated hard links from the cloud object storage system to the production system further comprising:
   determining the old list of the list of inode numbers;
   determining the new list of the list of inode numbers;
   retrieving the metadata reference;
   storing on to the production system the new list of the inode numbers; and
   determining the hard link on the production system and restoring the hard link and the files from the cloud object storage system to the production system.

15. A system for minimizing data transfer and storage utilization on cloud object storage systems, the system comprising:
   at least one processor; at least one memory device operably coupled to the at least one processor and storing instructions for execution on the at least one processor, the instructions causing the at least one processor to perform the steps of:

replicating a file from a production system to a cloud object storage system;

determining whether a number of hard links associated with the file is greater than one;

in the event the number of hard links is greater than one, creating, on the cloud object storage system, a special object for the file;

associating the file with the special object; upon creating a hard link on the production system in association with the file, replicating the hard link from the production system to the cloud object storage system and storing an associated hard link object on the cloud object storage system;

adding, on the cloud object storage system, a metadata reference from the hard link object to the special object;

determining a list of inode numbers which contains an old list and a new list of the list of inode numbers;

locating, on the cloud object storage system, the file and hard link object that reference the special object; and restoring the file and associated hard links from the cloud object storage system to the production system based on at least, the old list and/or the new list of the list of inode numbers.

16. The system of claim 15, wherein the special object is only created for a file having more than one hard link.

17. The system of claim 15, wherein determining whether a number of hard links associated with the file is greater than one comprises reading a hard link count maintained for the file.

18. The system of claim 15, wherein adding the metadata reference from the hard link object to the special object comprises adding an object path to the hard link object.

19. The system of claim 15, wherein replicating the hard link from the production system to the cloud object storage system comprises replicating the hard link without replicating data associated with the file.

20. The system of claim 15, wherein the special object is a hidden object.

* * * * *